US010729053B2

(12) United States Patent
Martin et al.

(10) Patent No.: US 10,729,053 B2
(45) Date of Patent: Aug. 4, 2020

(54) COMPACT PARALLEL ARM ROW CLEANER

(71) Applicants: Ronald Steve Martin, Elkton, KY (US); Asghar Rezasoltani, Bowling Green, KY (US)

(72) Inventors: Ronald Steve Martin, Elkton, KY (US); Asghar Rezasoltani, Bowling Green, KY (US)

(73) Assignee: Ronald Steve Martin, Elkton, KY (US)

(*) Notice: Subject to any disclaimer, the term of this patent is extended or adjusted under 35 U.S.C. 154(b) by 0 days.

(21) Appl. No.: 16/252,298

(22) Filed: Jan. 18, 2019

(65) Prior Publication Data

US 2019/0230842 A1 Aug. 1, 2019

Related U.S. Application Data

(60) Provisional application No. 62/623,198, filed on Jan. 29, 2018.

(51) Int. Cl.
| | |
|---|---|
| *A01B 39/22* | (2006.01) |
| *A01B 63/00* | (2006.01) |
| *A01C 5/06* | (2006.01) |
| *A01B 21/08* | (2006.01) |
| *A01C 7/00* | (2006.01) |
| *A01B 23/04* | (2006.01) |
| *A01B 63/24* | (2006.01) |
| *A01C 7/20* | (2006.01) |

(52) U.S. Cl.
CPC ............ *A01B 63/008* (2013.01); *A01B 21/08* (2013.01); *A01B 23/046* (2013.01); *A01B 39/22* (2013.01); *A01B 63/24* (2013.01); *A01C 5/064* (2013.01); *A01C 7/006* (2013.01); *A01C 7/203* (2013.01)

(58) Field of Classification Search
CPC ....... A01B 35/28; A01B 39/22; A01B 59/004; A01B 63/008; A01C 7/203
USPC ................................ 172/140, 398, 417, 779
See application file for complete search history.

(56) References Cited

U.S. PATENT DOCUMENTS

| | | | | |
|---|---|---|---|---|
| 6,253,692 B1* | 7/2001 | Wendling | ............... | A01C 7/006 111/139 |
| 7,159,523 B2* | 1/2007 | Bourgault | ............... | A01C 7/06 111/187 |
| 7,412,933 B2* | 8/2008 | Bourgault | ............... | A01C 7/203 111/156 |
| 7,574,969 B1* | 8/2009 | Henry | ..................... | A01C 7/203 111/152 |
| 8,028,759 B2* | 10/2011 | Ryder | ..................... | A01C 7/203 111/135 |
| 8,555,798 B2* | 10/2013 | Schilling | ............... | A01C 7/205 111/163 |
| 9,585,302 B2* | 3/2017 | Anderson | ............... | A01C 5/066 |

(Continued)

*Primary Examiner* — Gary S Hartmann
(74) *Attorney, Agent, or Firm* — Duncan Galloway Egan Greenwald, PLLC; Kevin T. Duncan

(57) ABSTRACT

An apparatus and system for adjustably controlling the position and depth of row cleaner wheels in no-till planting applications, the apparatus comprising a frame, a piston movably secured at the top to the frame, first and second sets of parallel arms disposed on either side of the piston and movably secured at one end to the frame and at the other end to a hub stem, and a set of piston arms each movably secured at the top to one of the first or second set of parallel arms and at the other end to the bottom of the piston.

13 Claims, 14 Drawing Sheets

(56) References Cited

U.S. PATENT DOCUMENTS

| | | | | |
|---|---|---|---|---|
| 9,674,997 | B2* | 6/2017 | Ryder | A01C 7/203 |
| 9,980,421 | B1* | 5/2018 | Hammes | A01C 7/203 |
| 9,986,671 | B1* | 6/2018 | Hammes | A01C 7/201 |
| 10,555,452 | B2* | 2/2020 | Martin | A01B 21/08 |

* cited by examiner

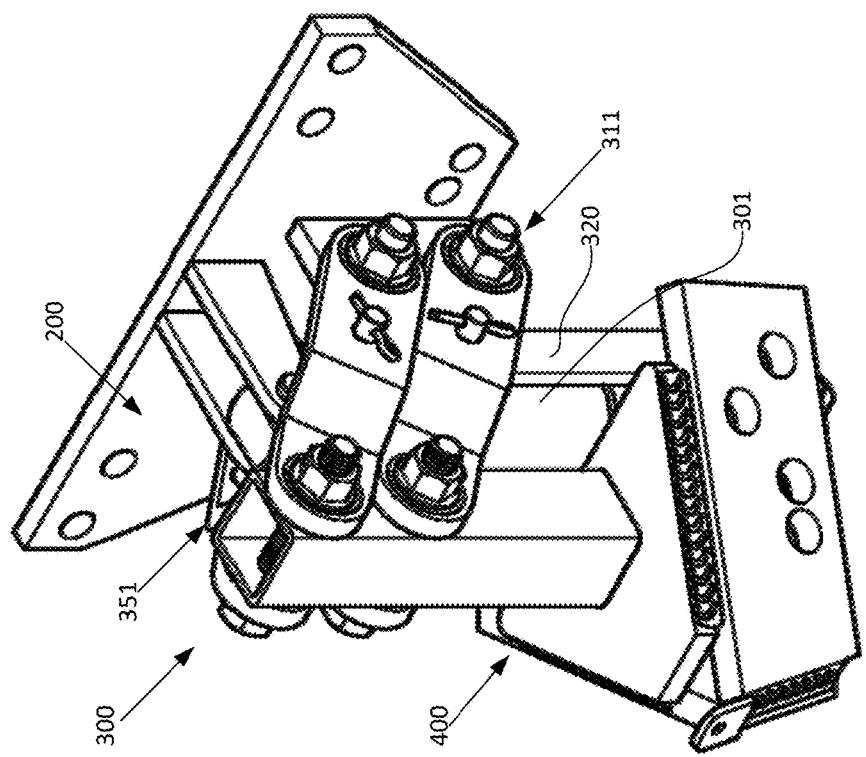
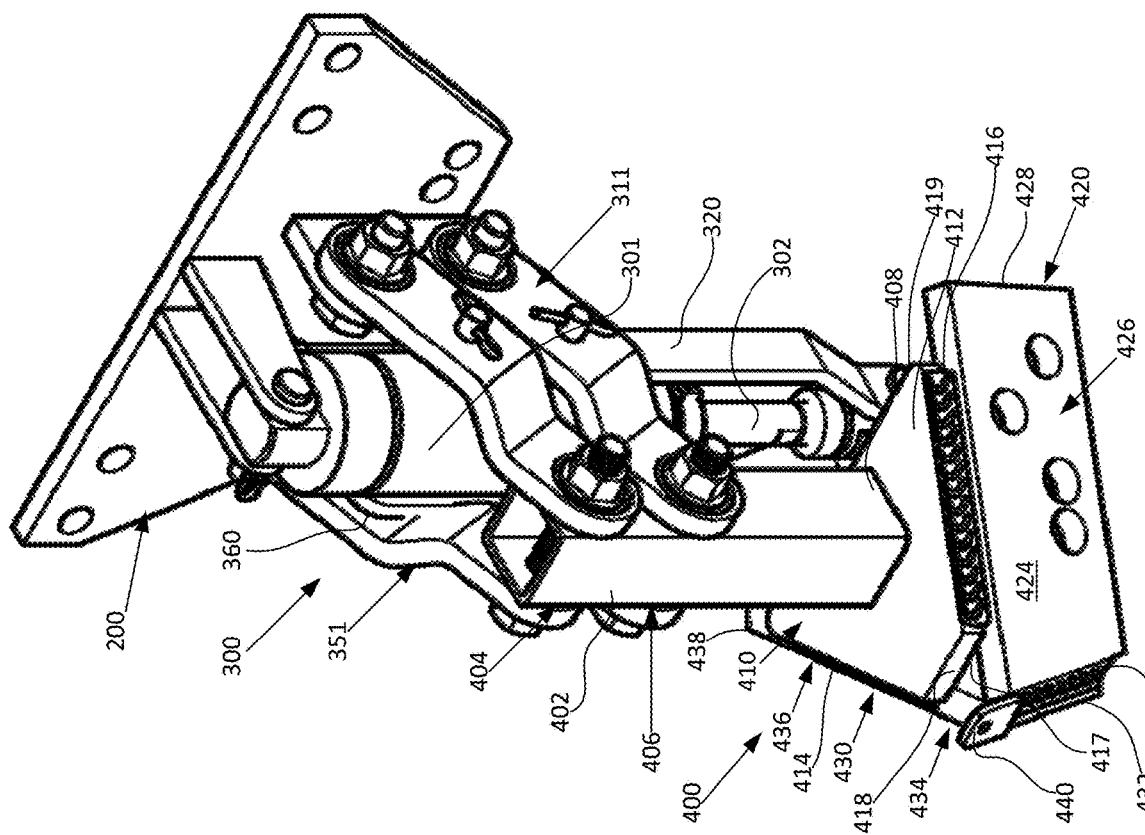

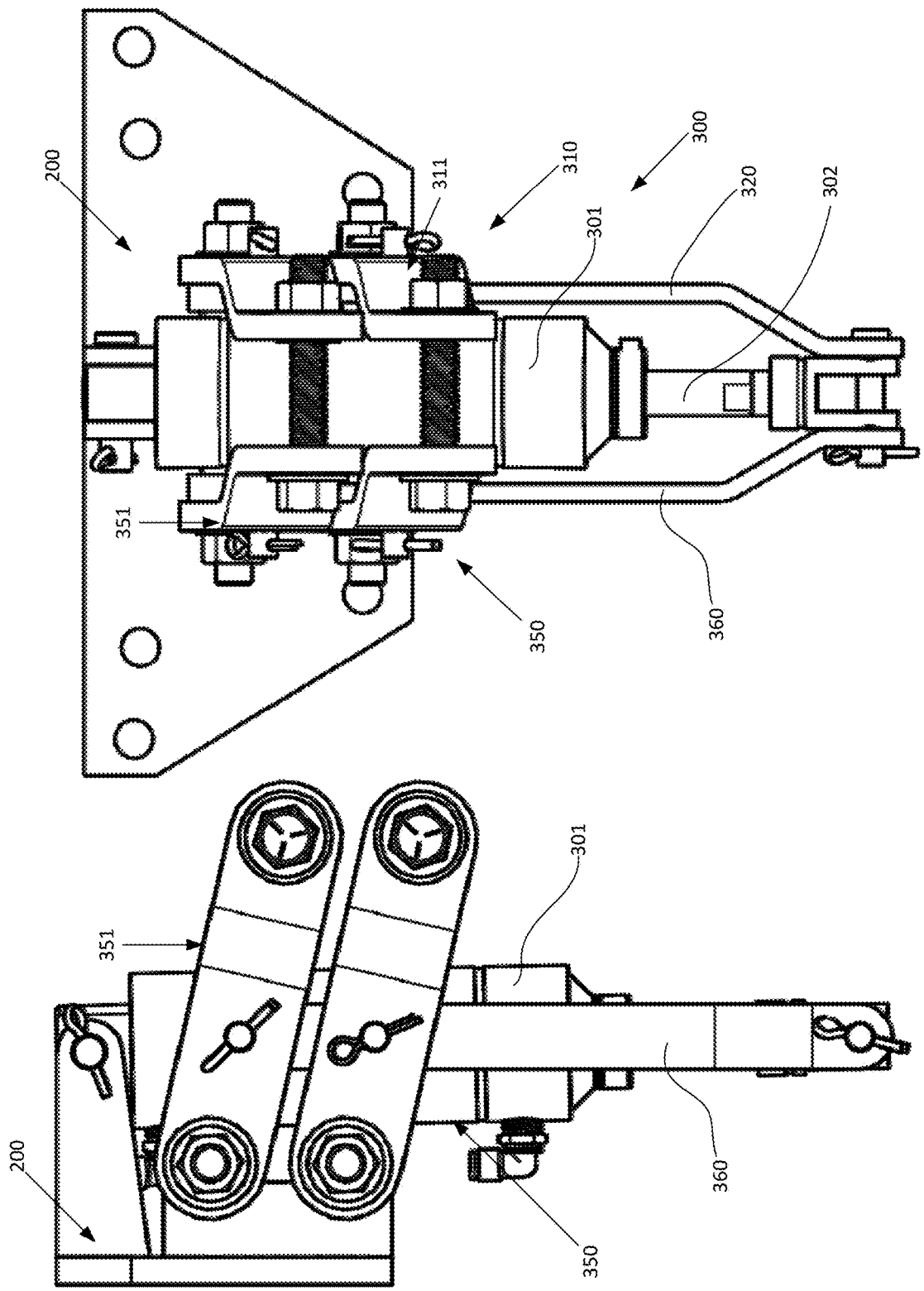

COMPACT PARALLEL ARM ROW CLEANER

CROSS-REFERENCE TO RELATED APPLICATIONS

This patent application claims benefit of priority under 35 U.S.C. § 119(e) to U.S. Provisional Patent Application Ser. No. 62/623,198 filed Jan. 29, 2018, entitled COMPACT PARALLEL ARM ROW CLEANER, the entirety of which is hereby incorporated by reference.

FIELD OF THE INVENTION

The present disclosure is generally applicable to the field of agricultural equipment, and more particularly for improved row cleaning in no-till farming applications.

AUTHORIZATION PURSUANT TO 37 C.F.R. § 1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" farming systems. In these farming systems, plant matter left over from previous harvests, called residue, is left in the fields between plantings. At the time of planting, a row cleaner system is used with a planter to clear only a small portion or strip of earth of the residue to enable seeds and fertilizer to be placed in the ground. The row cleaner removes the residue and only very lightly tills the topmost soil or earth to provide for a clear path for seed and fertilizer placement.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The movement towards no-till farming systems has driven the improvement of row cleaner apparatuses for planting systems. Existing row cleaner systems include fixed row cleaners, adjustable row cleaners, and floating row cleaners. However, these existing row cleaner systems have drawbacks. Fixed row cleaners do not follow or track changes in land elevation as the planter moves over a field. Adjustable and floating row cleaners may not posses the ideal geometry with respect to a planter to provide for optimal row cleaning action by the cleaner wheel assemblies.

What is needed is a compact row cleaner that can both follow or track changes in land elevation and maintain an optimal geometry or angle with respect to the planter or plater system.

SUMMARY OF THE INVENTION

The present invention provides a compact parallel arm floating row cleaner system that solves problems presented by prior art row cleaner systems. The compact parallel arm floating row cleaner system provides the benefits of a floating row cleaner in a form factor typically associated with fixed row cleaner assemblies.

The compact parallel arm floating row cleaner comprises a piston positioned in a vertical orientation, parallel to a frame mounting plate, the piston secured at its top to the frame mounting plate by a retaining pin. Disposed on either side of the piston are a set of parallel arms and one of a set of piston arms. Each arm in the sets of parallel arms on either side of the piston are secured by fastener to the frame mounting plate at one end, a proximal end, and are permitted to move rotatably in an angular fashion about the mounting point by a bushing or bearing. At the other end of each arm, a distal end, each arm is similarly secured to a mounting point at the top or upper end of a stem assembly. A piston arm is secured at its top to each arm in a set of parallel arms by a retaining pin, and is secured at the bottom of the piston arm to the bottom of the piston by a retaining pin. In this exemplary configuration, a first arm assembly comprising two parallel arms and one piston arm is disposed on one side of the piston and a second arm assembly also comprising two parallel arms and one piston arm is disposed on the opposite side of the piston.

As the piston extends and retracts, or compresses and decompresses, it maintains a substantially vertical position relative to the ground. The vertical orientation of the piston relative to the ground provides for the compact parallel arm floating row cleaner of the present invention to maintain a form factor typically associated with fixed row cleaner assemblies while providing the ground or terrain following features of a floating row cleaner assembly. The sets of parallel arms in the first and second arm assemblies change angle or orientation with respect to the piston and frame mounting plate, and also with respect to a stem assembly, but the stem assembly and piston maintain a constant, substantially vertical orientation and remain substantially parallel to one another as the piston compresses and decompresses to follow changes in terrain elevation.

By maintaining the orientation and angle of the stem assembly, the compact parallel arm floating row cleaner of the present invention keeps the row cleaning wheels of the wheel assemblies in the desired orientation with respect to the ground to provide for optimal row cleaning without digging too deeply into the earth. The stem assembly can only travel vertically up and down following the movement of the piston arm, thereby preventing any changes in angle of the row cleaner wheel assemblies with respect to the ground as the compact parallel arm floating row cleaner moves to follow changes in the terrain. This provides for cleaning of the earth in the row at a constant depth providing for ideal planting conditions. In another embodiment, the piston may be positioned in a horizontal, perpendicular orientation relative to the frame mounting plate extending outwards from the plate, or may be positioned in a relatively horizontal, parallel position relative to the frame mounting plate.

In a first embodiment, the present invention provides an apparatus for controlling the position of a row cleaner comprising: a frame mount plate; a parallel arm floating assembly comprising: a piston having a top and a bottom, the top being movably secured to the frame; a first set of arms, each arm in the first set of arms having a proximal end and a distal end, the proximal end movably secured to the frame; a second set of arms, each arm in the second set of arms having a proximal end and a distal end, the proximal end movably secured to the frame; a set of piston arms having a top and a bottom, the top of each arm in the set of piston arms movably secured to an arm in one of the first set of arms or the second set of arms, the bottom of each arm in the set of piston arms movably secured to the bottom of the piston; wherein the piston is disposed between the first set of arms and the second set of arms; and wherein the piston and the set of piston arms maintain a relative angle when the piston changes from a compressed to an uncompressed state (optionally referred to as from a retracted to an extended state) and the first set of arms and the second set of arms change in angular orientation with respect to the frame, the piston, and the piston arms when the piston moves from a compressed to an uncompressed state.

The apparatus may further comprise a stem assembly. The apparatus may further comprise wherein the stem assembly is disposed between the distal end of the first set of arms and the distal end of the second set of arms. The apparatus may further comprise wherein the stem assembly provides stability to the first set of arms and the second set of arms. The apparatus may further comprise wherein both of the first set of arms and the second set of arms comprise a pair of parallel arms. The apparatus may further comprise a set of wheel assemblies disposed on the stem assembly. The apparatus may further comprise wherein the first set of arms, the second set of arms, the set of piston arms, and the piston provide for the movement of the stem assembly and the set of wheel assemblies up and down in a vertical direction. The apparatus may further comprise wherein the movement of the stem assembly and the set of wheel assemblies does not change the angle of the of the set of wheel assemblies with respect to a surface. The apparatus may further comprise wherein the set of wheel assemblies comprise row cleaner wheels. The apparatus may further comprise wherein the set of wheel assemblies comprise one or more selected form the group consisting of treader wheels and scrapers. The apparatus may further comprise the piston is a pneumatic piston. The apparatus may further comprise the piston is adjustable remotely. The apparatus may further comprise the piston further comprises a piston shaft secured to the set of piston arms.

BRIEF DESCRIPTION OF THE FIGURES

In order to facilitate a full understanding of the present invention, reference is now made to the accompanying drawings, in which like elements are referenced with like numerals. These drawings should not be construed as limiting the present invention, but are intended to be exemplary and for reference.

FIG. 12 provides a perspective view of a compact parallel arm row cleaner with the stem assembly and parallel arm assembly in a lowered or uncompressed state according to an embodiment of the present invention.

FIG. 13 provides a perspective view of a compact parallel arm row cleaner with the stem assembly and parallel arm assembly in a raised or compressed state according to an embodiment of the present invention.

FIG. 17 provides a right side view of a parallel arm assembly for a compact parallel arm row cleaner in a lowered or uncompressed state according to an embodiment of the present invention.

FIG. 18 provides a front view of a parallel arm assembly for a compact parallel arm row cleaner in a lowered or uncompressed state according to an embodiment of the present invention.

DETAILED DESCRIPTION—LISTING OF ELEMENTS

Figure 1:
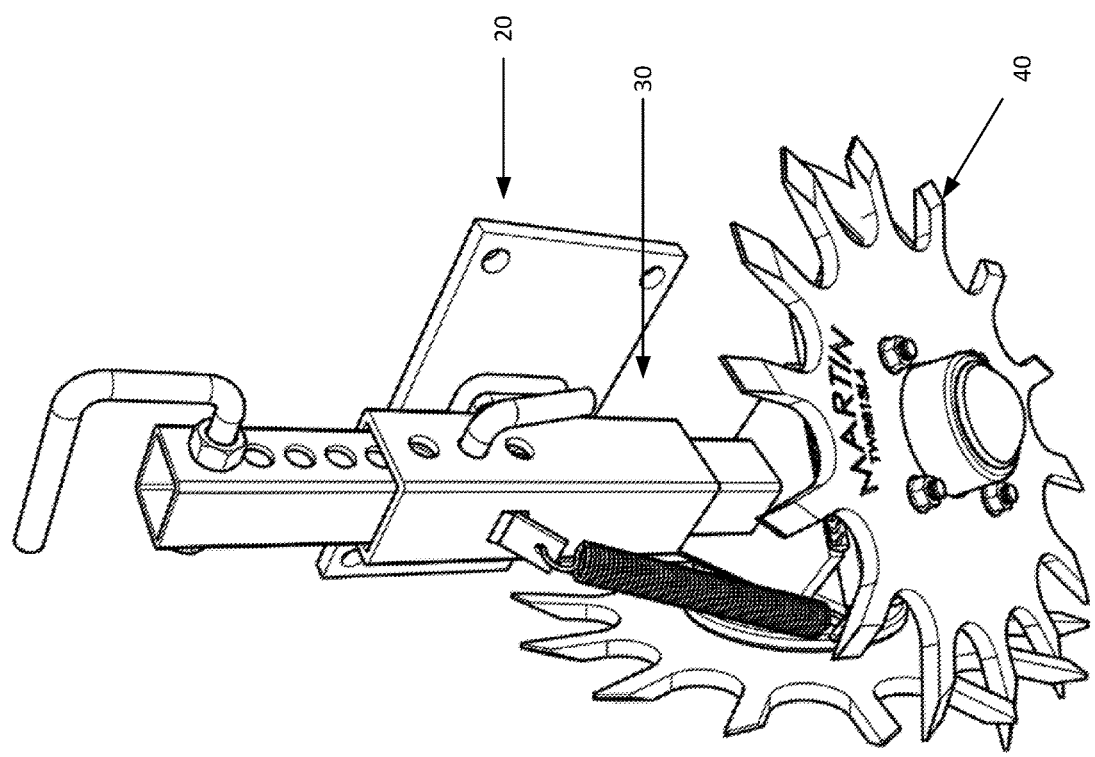
FIG. 1 provides a perspective view of a prior art fixed row cleaner.

| Element Description | Element Number |
|---|---|
| Compact Parallel Arm Row Cleaner | 100 |
| Frame Mounting Plate | 200 |
| Mounting Plate Front | 202 |
| Mounting Plate Rear | 204 |
| Mounting Plate Top | 206 |
| Mounting Plate Bottom | 208 |
| Upper Mounting Points | 212 |
| Lower Mounting Points | 214 |
| First Lower Flange | 220 |
| First Lower Flange Upper Mounting Point | 222 |
| First Lower Flange Lower Mounting Point | 224 |
| Second Lower Flange | 230 |
| Second Lower Flange Upper Mounting Point | 232 |
| Second Lower Flange Lower Mounting Point | 234 |
| First Upper Flange | 240 |
| First Upper Flange Mounting Point | 242 |
| First Upper Flange Proximal End | 244 |
| First Upper Flange Distal End | 246 |
| Second Upper Flange | 250 |
| Second Upper Flange Mounting Point | 252 |
| Second Upper Flange Proximal End | 254 |
| Second Upper Flange Distal End | 256 |
| Parallel Arm Floating Assembly | 300 |
| Piston | 301 |
| Piston Shaft | 302 |
| Piston Shaft End | 303 |
| Piston Shaft End Gap | 304 |
| Piston Shaft Pin Openings | 305 |
| Piston Lower Retaining Pin | 306 |
| Piston Upper Lug | 307 |
| Piston Upper Lug Retaining Pin | 308 |
| Piston Upper Lug Pin Opening | 309 |
| Upper Pneumatic Connection | 90 |
| Lower Pneumatic Connection | 95 |
| Left Arm Assembly | 310 |
| Left Parallel Arms | 311 |
| Left Upper Arm Frame Fastener | 312 |
| Left Upper Arm Frame Bushing | 313 |
| Left Upper Arm Frame Nut | 314 |
| Left Lower Arm Frame Fastener | 315 |
| Left Lower Arm Frame Bushing | 316 |
| Left Lower Arm Frame Nut | 317 |
| Left Piston Arm | 320 |
| Left Piston Arm Bend | 322 |
| Left Piston Arm Lower Pin Opening | 324 |
| Left Piston Arm First Upper Pin Opening | 326 |
| Left Piston Arm Second Upper Pin Opening | 328 |
| Left Upper Arm | 330 |
| Left Upper Arm Frame Pivot Opening | 332 |
| Left Upper Arm Bend | 334 |
| Left Upper Arm Forward Pivot Opening | 336 |
| Left Upper Arm Piston Arm Pin Opening | 338 |
| Left Lower Arm | 340 |
| Left Lower Arm Frame Pivot Opening | 342 |
| Left Lower Arm Bend | 344 |
| Left Lower Arm Forward Pivot Opening | 346 |
| Left Lower Arm Piston Arm Pin Opening | 348 |
| Right Arm Assembly | 350 |
| Right Parallel Arms | 351 |
| Right Upper Arm Frame Fastener | 352 |
| Right Upper Arm Frame Bushing | 353 |
| Right Upper Arm Frame Nut | 354 |
| Right Lower Arm Frame Fastener | 355 |
| Right Lower Arm Frame Bushing | 356 |
| Right Lower Arm Frame Nut | 357 |
| Right Piston Arm | 360 |
| Right Piston Arm Bend | 362 |
| Right Piston Arm Lower Pin Opening | 364 |
| Right Piston Arm First Upper Pin Opening | 366 |
| Right Piston Arm Second Upper Pin Opening | 368 |
| Right Upper Arm | 370 |
| Right Upper Arm Frame Pivot Opening | 372 |
| Right Upper Arm Bend | 374 |
| Right Upper Arm Forward Pivot Opening | 376 |
| Right Upper Arm Piston Arm Pin Opening | 378 |
| Right Lower Arm | 380 |
| Right Lower Arm Frame Pivot Opening | 382 |
| Right Lower Arm Bend | 384 |
| Right Lower Arm Forward Pivot Opening | 386 |
| Right Lower Arm Piston Arm Pin Opening | 388 |
| Forward Upper Pivot Fastener | 390 |
| Forward Upper Right Bushing | 392 |
| Forward Upper Left Bushing | 393 |
| Forward Upper Left Nut | 394 |
| Forward Lower Pivot Fastener | 395 |
| Forward Lower Right Bushing | 397 |
| Forward Lower Left Bushing | 398 |
| Forward Lower Left Nut | 399 |
| Stem Assembly | 400 |
| Stem Body | 402 |
| Stem Upper Pivot Mounts | 404 |
| Stem Lower Pivot Mounts | 406 |
| Stem Body Bottom | 408 |
| Stem Base Plate | 410 |
| Stem Base Plate Top | 412 |
| Stem Base Plate Right Side | 414 |
| Stem Base Plate Left Side | 416 |
| Stem Base Plate Bottom | 417 |
| Stem Base Plate Front | 418 |
| Stem Base Plate Back | 419 |
| Left Hub Mount Plate | 420 |
| Left Hub Mount Plate Front | 422 |
| Left Hub Mount Plate Face | 424 |
| Left Hub Mount Plate Fastener Openings | 426 |
| Left Hub Mount Plate Rear | 428 |
| Right Hub Mount Plate | 430 |
| Right Hub Mount Plate Front | 432 |
| Right Hub Mount Plate Face | 434 |
| Right Hub Mount Plate Fastener Openings | 436 |
| Right Hub Mount Plate Rear | 438 |
| Stem Tab | 440 |
| Wheel Assemblies | 500 |
| Right Wheel Assembly | 510 |
| Right Treader Wheel | 512 |
| Right Cutter Wheel | 514 |
| Right Cutter Wheel Tine | 516 |
| Right Wheel Hub | 518 |
| Right Scraper | 520 |
| Left Wheel Assembly | 550 |
| Left Treader Wheel | 552 |
| Left Cutter Wheel | 554 |
| Left Cutter Wheel Tine | 556 |
| Left Hub | 558 |
| Left Scraper | 560 |
| Treader Wheel Spoke | 562 |
| Hub Fasteners | 564 |

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Figure 3:
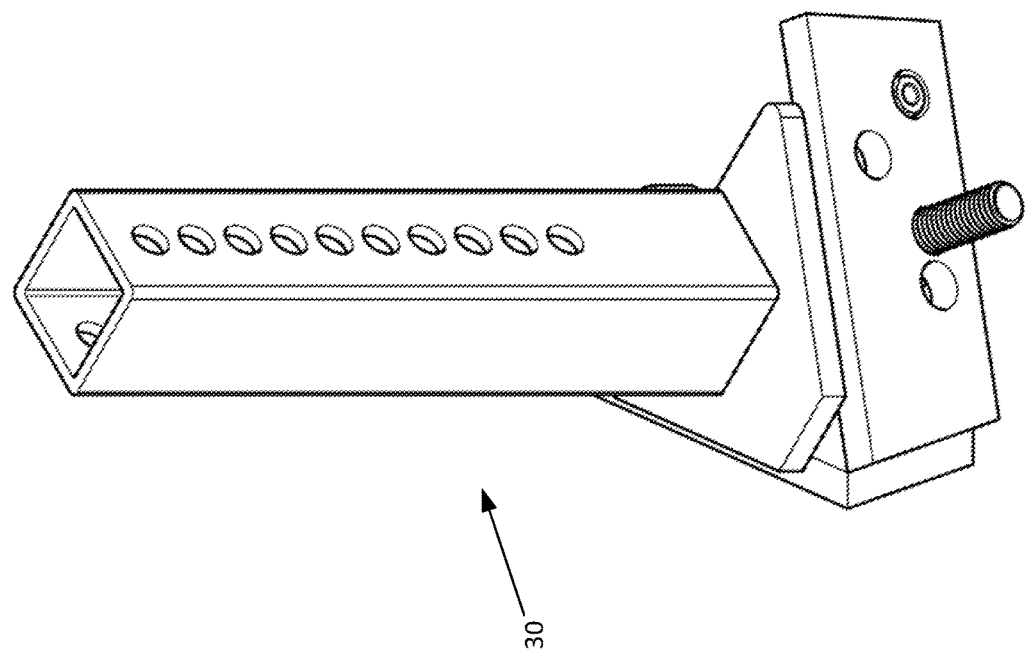
FIG. 3 provides a perspective view of a prior art fixed row cleaner stem.
Figure 2:
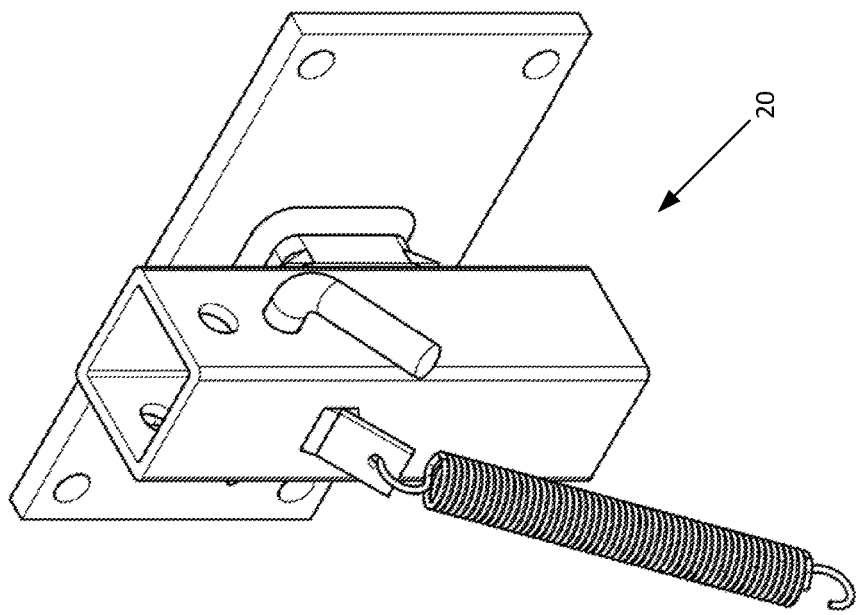
FIG. 2 provides a perspective view of a prior art fixed row cleaner mount and receiver tube.

With reference now to the drawings, FIGS. 1, 2 and 3 provide perspective views of a prior art pin-adjustable fixed row cleaner assembly 10. The assembly 10 of the art system comprises a frame 20, a stem 30, and a set of wheels and hubs 40. The frame 20 is typically secured on a planter, which may be, for example, an 800, 900, 1200, or 1300 series planter from CASE IH, a JD 7000 or JD 1700 series planter from JOHN DEERE, or a 2000, 3000, or 4000 series planter from KINZE, or a 5000, 6000, 8000, or 9000 series planter from WHITE. A stem 30, which may comprise a wheel hub mount is secured to the frame by a pin. The depth at which the wheels 40 clean the seed path is determined by the pin mounting points used for the frame 20 and stem 30. Limitations of this prior art fixed row cleaner assembly 10 include difficulty in adjusting the height or depth of the wheels 40 and a lack of ability for the fixed row cleaner assembly 10 to follow changes in height in terrain due to the position of the stem being fixed by a retaining pin. The benefits of a fixed row cleaner assembly 10 include the small profile of the assembly 10 and the lack of a change in angle of the wheels 40 as the fixed row cleaner assembly 10 moves over terrain.

Figure 4:
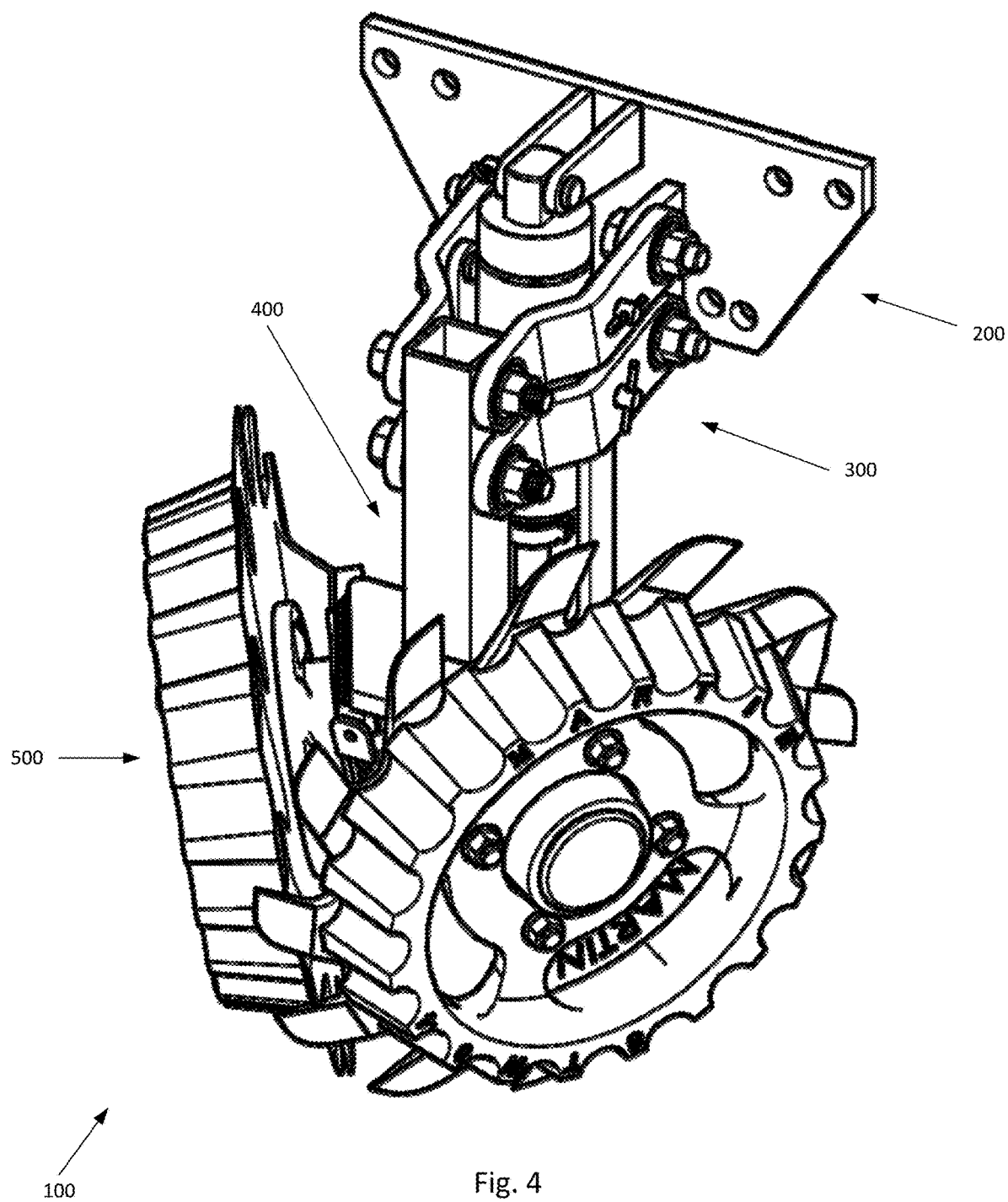
FIG. 4 provides a perspective view of a compact parallel arm row cleaner according to an embodiment of the present invention.

With reference now to FIGS. 4-20, various views and illustrations of an embodiment of a compact parallel arm row cleaner 100 according to the present invention are provided. The compact parallel arm row cleaner 100 of the present invention improves over existing floating row cleaner and fixed row cleaner designs. As shown in FIG. 4, the compact parallel arm floating row cleaner 100 of the present invention comprises a frame mounting plate 200, a parallel arm floating assembly 300, a stem assembly 400, and wheel assemblies 500. The compact parallel arm floating row cleaner 100 provides the benefits of the fixed row cleaner assembly 10 while also providing many of the benefits of existing floating row cleaners.

With fixed row cleaners like the fixed row cleaner assembly 10 are fixed in position and do not travel or move to follow or track the terrain that the planter and assembly are moving over. However, fixed row cleaner assemblies like the assembly 10 are compact in size which is desirable in some applications and with some planter models. Other row cleaner designs, such as adjustable row cleaners as provided in U.S. Pat. No. 7,861,660, entitled ADJUSTABLE ROW CLEANER, Martin, issued Jan. 4, 2011; U.S. Pat. No. 8,794,165, entitled ADJSUTABLE ROW CLEANER, Martin, issued Aug. 5, 2014; and in U.S. Pat. No. 9,743,572, entitled ADJUSTABLE ROW CLEANER, Martin, issued Aug. 29, 2017; and such as floating row cleaners provided U.S. Pat. No. 8,631,879B1, entitled COMPACT FLOATING ROW CLEANER, Martin, issued Jan. 21, 2014; and U.S. Pat. No. 9,642,298, entitled COMPACT FLOATING ROW CLEANER, Martin, issued May 9, 2017; each of which are incorporated by reference herein in their entirety, provide some benefits compared to the fixed row cleaner assembly 10. These benefits include wider compatibility with some planter models and greater compatibility with other attachments or apparatus, including the ability to fit a coulter wheel or similar device within the row cleaner frame.

In some of these row cleaner systems, the wheels are pushed against the ground by their weight, and the frame of the row cleaner must be long to keep the angle of the frame at the right angle of attack. In other designs a pneumatic air cylinder may be attached to the floating row cleaner to increase or decrease the pushing force of the wheels to the ground and to make the wheels more or less aggressive in digging the ground. However, these designs may still change the relative angle of the cleaning wheel assemblies to the ground as they move over terrain having different elevations or height changes. Furthermore, there are at least two problems associated with existing floating row cleaner designs. First, they are long, and the wheels in existing designs run far ahead from the planter (i.e., they extend outwards a relatively large distance from the mount attached to the planter). Second, since the frame swings around the pin point at the frame mount, the angle between the wheels and the ground changes when the frame swings.

The compact parallel arm floating row cleaner 100 of the present invention is relatively as compact as pin adjust or fixed row cleaner assembly 10, but can move the wheels 500 vertically, both up and down, without changing the angle between the wheels 500 and the ground. The four arms of the parallel arm floating assembly 300 always keeps the stem assembly 400 vertical and parallel to the frame mounting plate 200. In the embodiment provided in FIG. 4, the parallel arm floating assembly 300 is secured by a fastener to the frame mounting plate 200 and is able to move rotationally about the fastener by a bushing or bearing.

Figure 5:
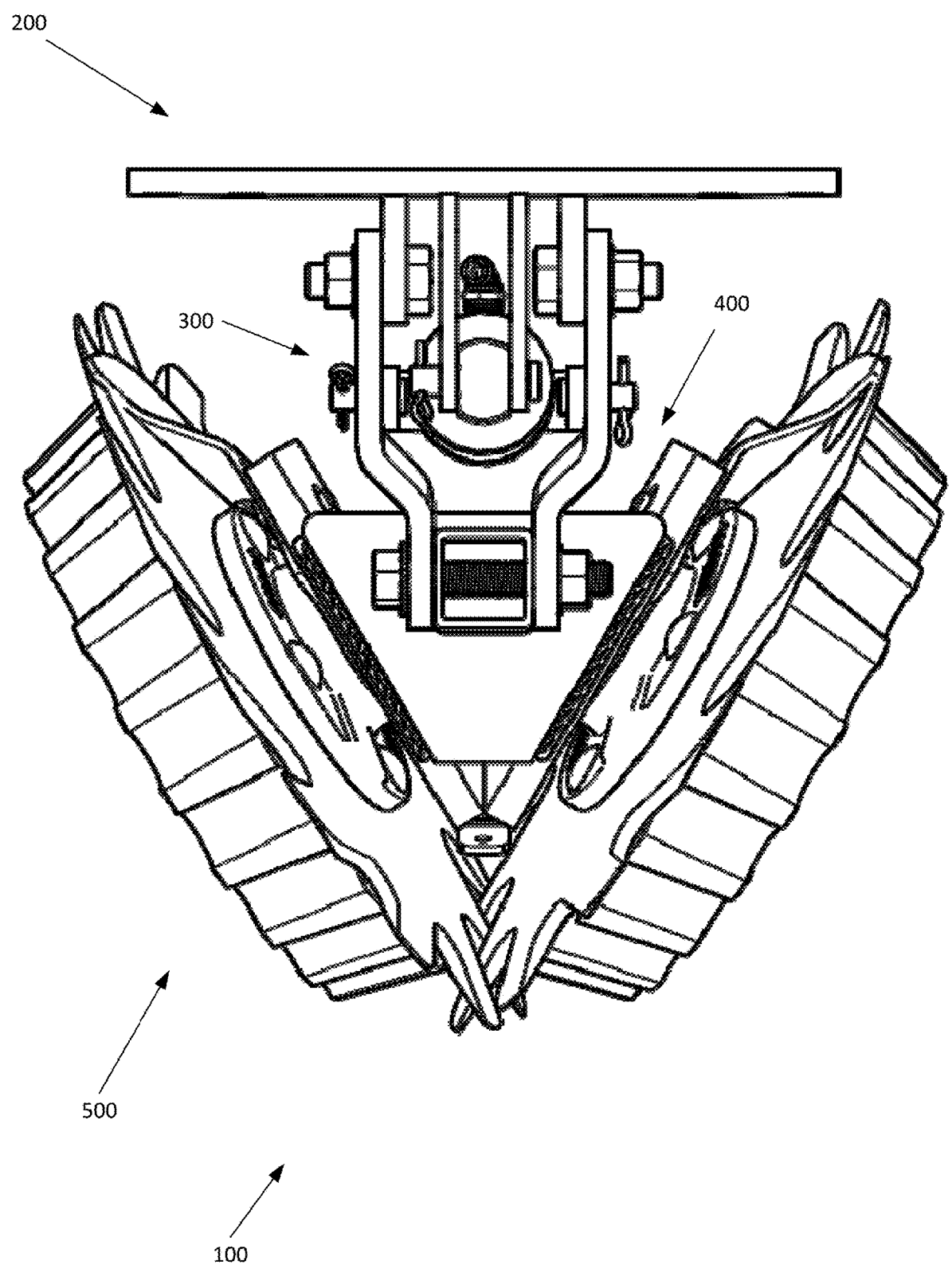
FIG. 5 provides a top view of a compact parallel arm row cleaner according to an embodiment of the present invention.
Figure 6:
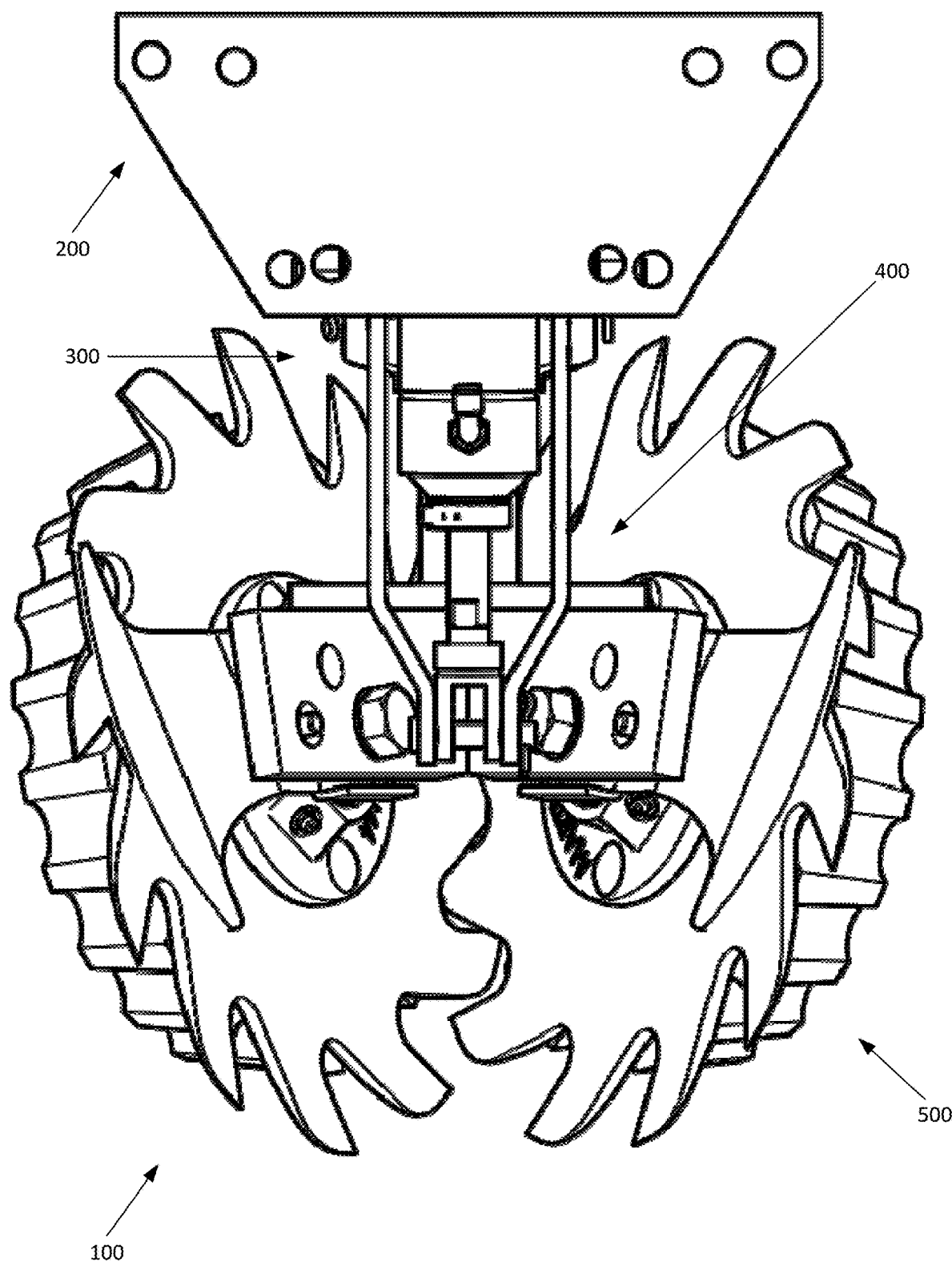
FIG. 6 provides a rear view of a compact parallel arm row cleaner according to an embodiment of the present invention.

With reference now to FIG. 5, a top view of a compact parallel arm row cleaner 100 according to an embodiment of the present invention is provided. In this view, the orientation of the parallel arm floating assembly 300 with respect to the frame mounting plate 200 and the stem assembly 400 can be seen. The stem assembly 400 is positioned out a short distance from the frame mounting plate 200 by the parallel arm floating assembly 300 and is permitted to move up and down vertically with respect to the ground by the parallel arm floating assembly 300 while maintaining a generally parallel orientation with respect to the frame mounting plate 200. The relative angle of elements of the parallel arm floating assembly 300 change with respect to the frame mounting plate 200 and stem assembly 400, but the stem assembly 400 and frame mounting plate 200 maintain a substantially parallel relative orientation. FIG. 6 provides a rear view of the compact parallel arm row cleaner 100 including the frame mounting plate 200, the parallel arm floating assembly 300, the stem assembly 400, and the wheel assemblies 500.

Figure 7:
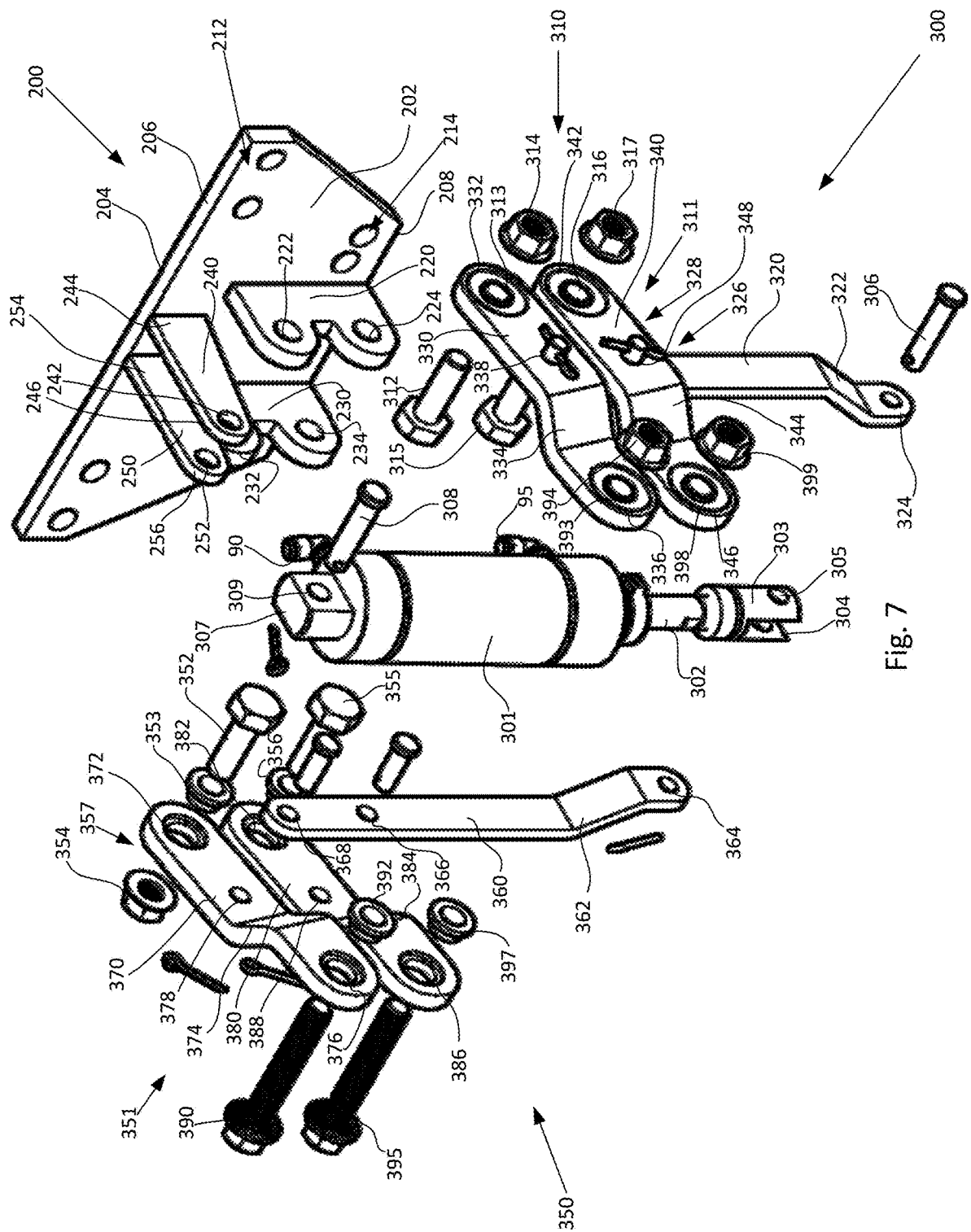
FIG. 7 provides a perspective exploded view of a frame mounting plate and parallel arm assembly for a compact parallel arm row cleaner according to an embodiment of the present invention.

With reference now to FIG. 7, a perspective exploded view of the frame mounting plate 200 and parallel arm floating assembly 300 for the compact parallel arm row cleaner 100 is provided. The frame mounting plate has a mounting plate front 202, mounting plate rear 204, mounting plate top 206, and mounting plate bottom 208. Disposed on the mounting plate front 202 are the first lower flange 220 having an upper mounting point 222 and lower mounting point 224, the second lower flange 230 having an upper mounting point 232 and lower mounting point 234, a first upper flange 240 having a proximal end 244 and a mounting point 242 located at a distal end 246, and a second upper flange 250 having a proximal end 254 and a mounting point 252 located at a distal end 256. The flanges 220, 230, 240, and 250 and respective mounting points are used to secure elements of the parallel arm floating assembly 300 to the frame mounting plate 200 by fasteners such as bolts with nuts and bushings or bearings, or retaining pints with cotter pins. The frame mounting plate 200 may be secured to a planter or other device by the upper mounting points 212 and lower mounting points 214. The number and position of these mounting points will depend on the type of device or apparatus onto which the frame mounting plate 200 will be secured and the provided exemplary embodiment is not limiting on the invention.

The parallel arm floating assembly 300 comprises a piston 301, left arm assembly 310, and right arm assembly 350. The piston 301 has a piston shaft 302 with shaft end 303, shaft end gap 304, and shaft pin openings 305 and is secured by a piston retaining pin 306 at the bottom of the piston 301. The piston 301 has a piston upper lug 307 with an upper lug pin opening 309 which may receive the upper lug retaining pin 308 to secure the top of the piston 301 to the first upper flange 240 and second upper flange 250 of the frame mounting plate 200. The piston 301 may be a pneumatic type piston such as a MARTIN SMARTCLEAN pneumatic piston, and also have an upper pneumatic connection 90 and a lower pneumatic connection 95, but may also be a suitable hydraulic or other piston type. These may be controlled by a system such as is described in U.S. patent application Ser. No. 15/690,269, entitled WIRELESS CONTROL SYSTEM FOR FLOATING ROW CLEANER, Martin, filed Aug. 29, 2017, which is incorporated by reference herein in its entirety.

Disposed on either side of the piston 301 are the left arm assembly 310 and the right arm assembly 350 on the left and right sides of the piston 301 respectively. The left arm assembly 310 comprises left parallel arms 311 and left piston arm 320. The left parallel arms 311 comprise a left upper arm 330 having a frame pivot opening 332, arm bend 334, forward pivot opening 336, and piston arm pin opening 338, and a left lower arm 340 having a frame pivot opening 342, arm bend 344, forward pivot opening 346, and piston arm pin opening 348. The left piston arm 320 has an arm bend 322, lower pin opening 324, first upper pin opening 326, and second upper pin opening 328. The right arm assembly 350 in the exemplary embodiment is a mirrored configuration to the left arm assembly 310 and comprises right parallel arms 351 and right piston arm 360. The left parallel arms 351 comprise a right upper arm 370 having a frame pivot opening 372, arm bend 374, forward pivot opening 376, and piston arm pin opening 378, and a right lower arm 380 having a frame pivot opening 382, arm bend 384, forward pivot opening 386, and piston arm pin opening 388. The left piston arm 360 has an arm bend 362, lower pin opening 364, first upper pin opening 366, and second upper pin opening 368.

Note that although shown for purposes of describing operation the invention is described in connection with two sets of parallel arms, e.g., 330/340 and 370/380, the arm assemblies may be alternatively configured to cooperatively connect with the frame and piston 301 to achieve the desired compact, essentially omni-directional movement of piston 301 in operation of the row cleaner assembly.

The piston 301 is disposed between the left arm assembly 310 and right arm assembly 350 and is secured to the first upper flange 240 and second upper flange 250 of the frame mounting plate 200 at the piston upper lug 307 by the piston upper lug retaining pin 308, and at the bottom by the piston lower retaining pin 306 to at the left piston arm lower pin opening 326 and right piston arm lower pin opening 366 of the respective left piston arm 320 and right piston arm 360. The left piston arm 320 and right piston arm 360 are secured to the respective left parallel arms 311 and right parallel arms 351 by retaining pins at about the middle, and before the arm bend, of each arm in the sets of parallel arms. These and other retaining pins in the present invention may be secured by cotter pins or other suitable locking means.

The configuration provided in this exemplary embodiment as shown in FIG. 7 enables the piston shaft 302 to extend down and retract up while keeping the piston 301 in a vertical configuration. The left parallel arms 311 and right parallel arms 351 may rotate about their respective frame pivot openings 332, 342, 372, and 382, and are kept in a parallel orientation with respect to each other by the left piston arm 320 and right piston arm 360. The stem assembly 400, shown in FIGS. 4-6, also provides for the maintaining of the parallel orientation within each set of parallel arms. The arm bends 334, 344, 374, and 384 of the parallel arms 311 and 351 and the arm bends 322 and 362 and piston arms 320 and 360 provide for the piston 301 to be disposed between the left parallel arm assembly 310 and the right arm assembly 350 without interfering with the arms of each assembly.

The left parallel arms 311 may be secured to the frame mounting plate 320 by upper arm frame fastener 312, bushing 313, and nut 314 and lower arm frame fastener 315, bushing 316, and nut 317. The right parallel arms 351 may be secured to the frame mounting plate 320 by upper arm frame fastener 352, bushing 353, and nut 354 and lower arm frame fastener 355, bushing 356, and nut 357. The left parallel arms 311 may be connected to the right parallel arms 351 and to the stem assembly 400 (shown in FIGS. 5-6, 12-14) by forward upper pivot fastener 390, and upper left nut 394, and by forward lower pivot fastener 395, and lower left nut 399. A set of upper left and right bushings 392 and 393 and a set of lower left and right bushings 397 and 398 may be used to permit the stem assembly 400 to move up and down and for the left 311 and right parallel arms 351 to change angle with respect to the stem assembly 400 as it moves without causing the stem assembly 400 to bind. Bushings used in the present invention may be replaced with bearings or other suitable means for providing for rotational movement about a fastener or pin.

Figure 9:
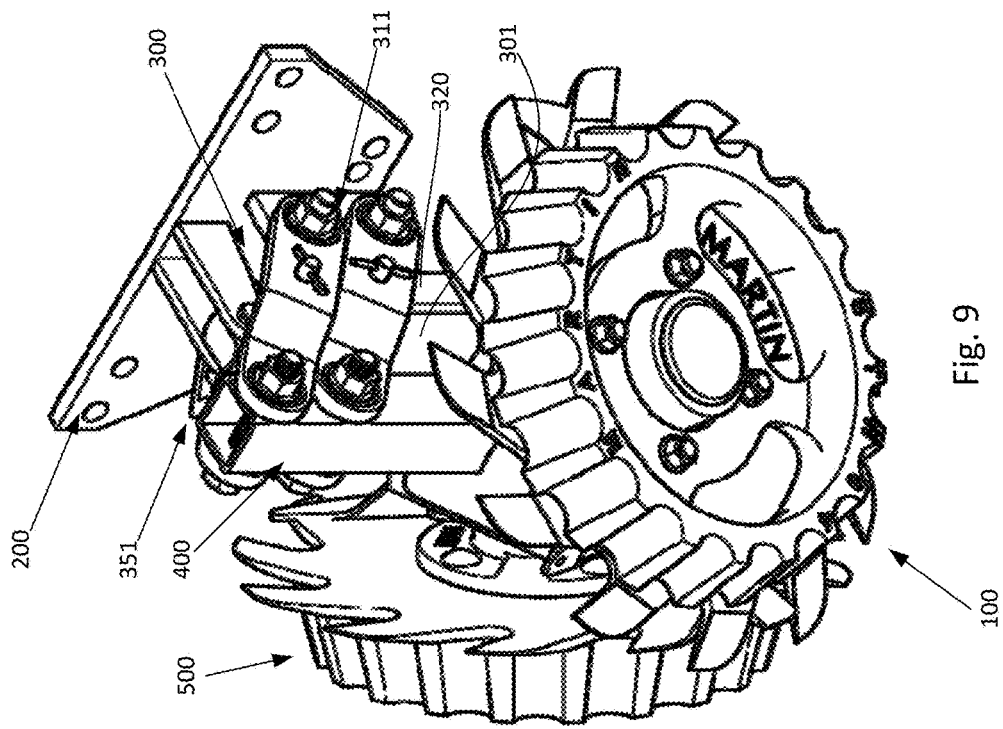
FIG. 9 provides a perspective view of a compact parallel arm row cleaner with the wheel assemblies, stem assembly, and parallel arm assembly in a raised or compressed state according to an embodiment of the present invention.
Figure 8:
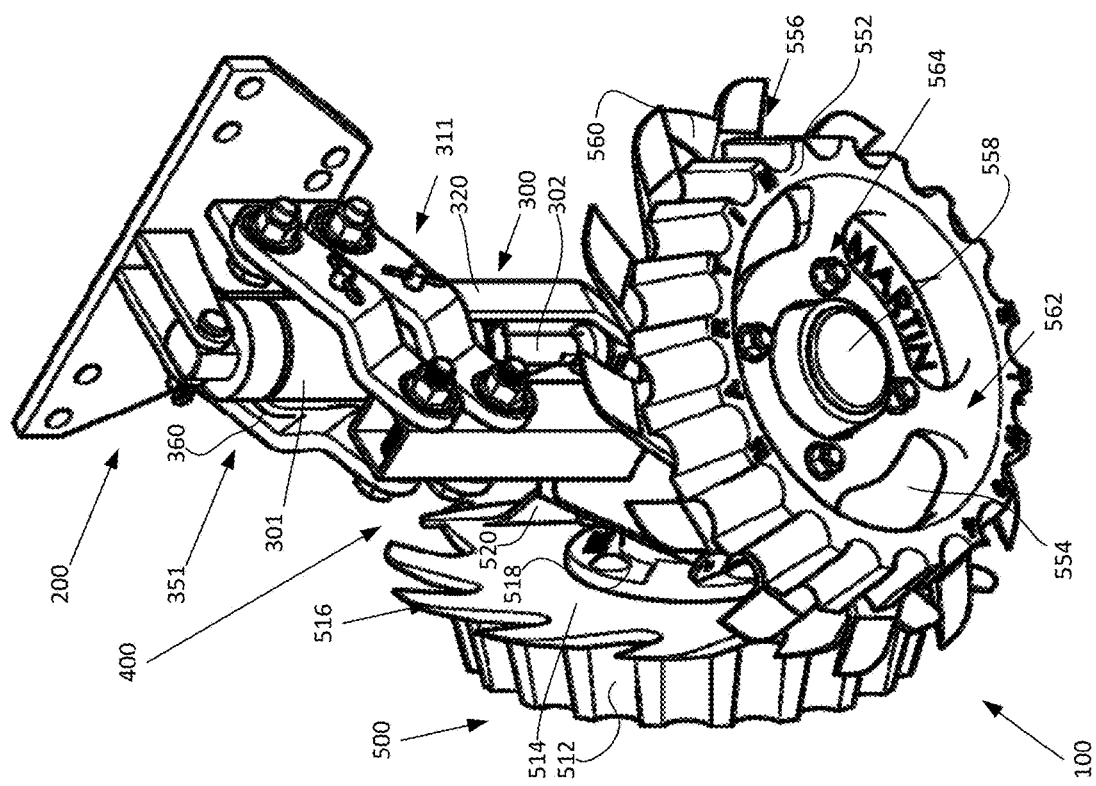
FIG. 8 provides a perspective view of a compact parallel arm row cleaner with the wheel assemblies, stem assembly, and parallel arm assembly in a lowered or uncompressed state according to an embodiment of the present invention.
Figure 11:
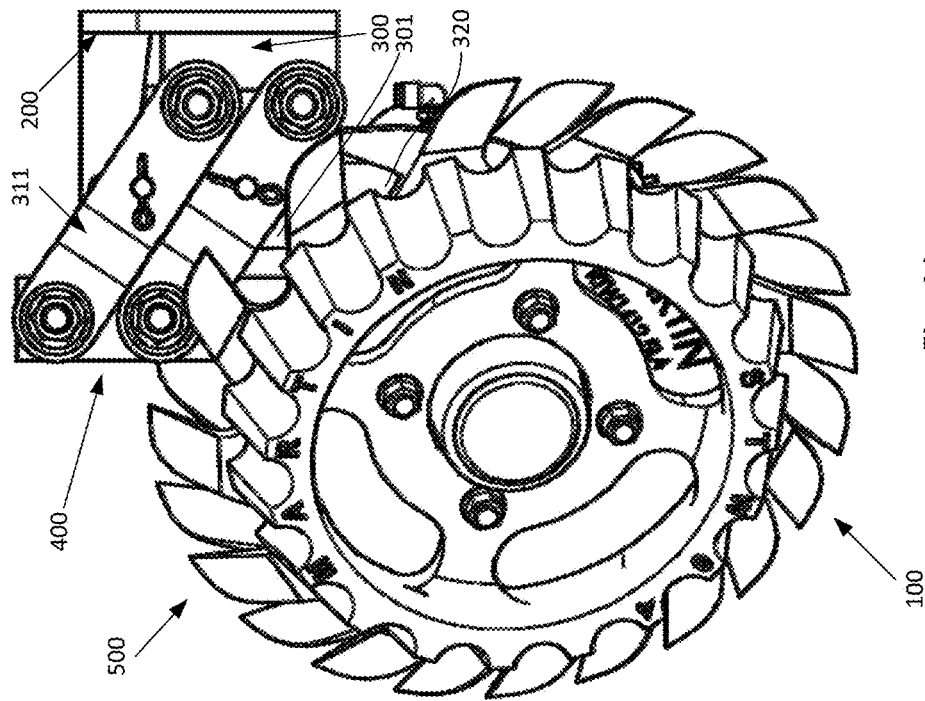
FIG. 11 provides a side view of a compact parallel arm row cleaner with the wheel assemblies, stem assembly, and parallel arm assembly in a raised or compressed state according to an embodiment of the present invention.
Figure 10:
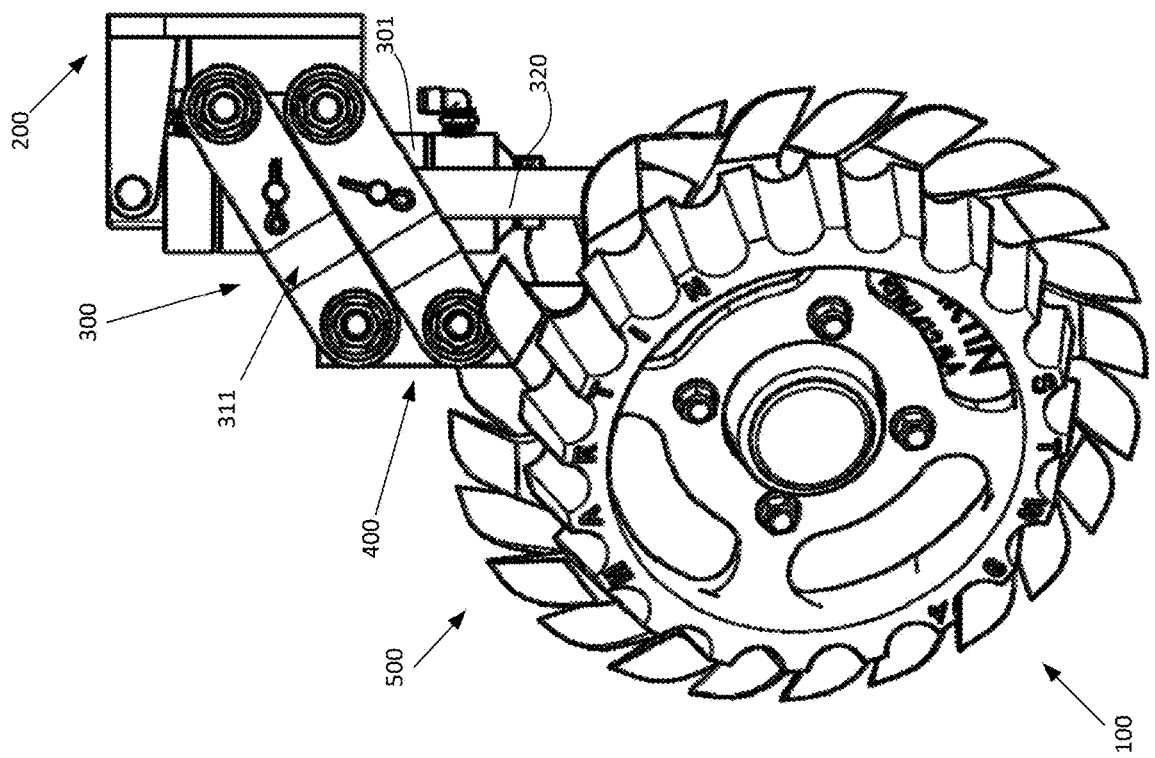
FIG. 10 provides a side view of a compact parallel arm row cleaner with the wheel assemblies, stem assembly, and parallel arm assembly in a lowered or uncompressed state according to an embodiment of the present invention.

With reference now to FIGS. 8, 9, 10, and 11, views of the compact parallel arm floating row cleaner 100 are provided. FIG. 8 provides a perspective view of the compact parallel arm row cleaner 100 with the wheel assemblies 500 and stem assembly 400, and having the parallel arm floating assembly 300 in a lowered or uncompressed state or also referred to as an extended state. FIG. 9 provides a perspective view of the compact parallel arm row cleaner 100 with the wheel assemblies 500 and stem assembly 400, and having the parallel arm floating assembly 300 in a raised or compressed state or optionally referred to as in a retracted state. FIG. 10 provides a left side view of the compact parallel arm row cleaner 100 with the wheel assemblies 500 and stem assembly 400, and having the parallel arm floating assembly 300 in a lowered or uncompressed or extended state. FIG. 11 provides a perspective view of the compact parallel arm row cleaner 100 with the wheel assemblies 500 and stem assembly 400, and having the parallel arm floating assembly 300 in a raised or compressed state (optionally referred to as a retracted state).

The embodiment of the compact parallel arm floating row cleaner 100 as provided in FIGS. 8-11 illustrates the relative movement of the elements of the frame mounting plate 200, parallel arm floating assembly 300, and stem assembly 400 with respect one another. The stem assembly 400 maintains a vertical orientation as it travels up and down as guided by the piston 301. As used herein, the term "piston", and in particular piston 301, means and includes an actuator or driver and includes any suitable mechanism to drive the stem assembly and connected wheel assemblies 500 through a substantially vertical range of motion from a fully extended position to a fully retracted position. Piston 301 may be hydraulic, electric, or pneumatic and may be controlled via electric, hydraulic, pneumatic or a hybrid system. Piston 301 is shown having a linear, mono-directional piston movement but may be rotary, screw or other style of movement with the sole requirement of providing a desired movement of the stem assembly and wheel assemblies in operation of the row cleaner. Piston 301 may also comprise a set of airbags, with one airbag disposed at the top of the piston and another disposed at the bottom, wherein the airbags may be independently inflated and deflated to provide for fine adjustment and control of the position of the piston.

In the example shown of piston 301, the left parallel arms 311 and right parallel arms 351 change in angle relative to the other elements including the stem assembly 400, piston 301, and piston arms 320 and 360, each of which maintains a relatively vertical orientation and similar relative angle over the length of travel of the piston shaft 302 as it extends and retracts and the stem assembly 400 travels vertically up and down. The left parallel arms 311 and right parallel arms 351 are stabilized by the left piston arm 320 and right piston arm 360, the frame mounting plate 200, and the stem assembly 400 as they rotate about the mounting points on the frame mounting plate 200 and stem assembly 400. The wheel assemblies 500 as shown in FIG. 8 may comprise a right wheel assembly 510 having a right treader wheel 512, right cutter wheel 514 with a set of right cutter wheel tines 516, right wheel hub 518, and right scraper 520, and may further comprise a left wheel assembly 550 having a left treader wheel 552 with a set of left treader wheel spokes 562, left cutter wheel 554 with a set of right cutter wheel tines 556, left hub 558 secured to the stem assembly 400 by a set of hub fasteners 564, left scraper 560. The wheel assemblies 500 perform the row cleaning action for the compact parallel arm floating row cleaner 100 when in operation, such as when being attached to a planter or planter system.

Figure 14:
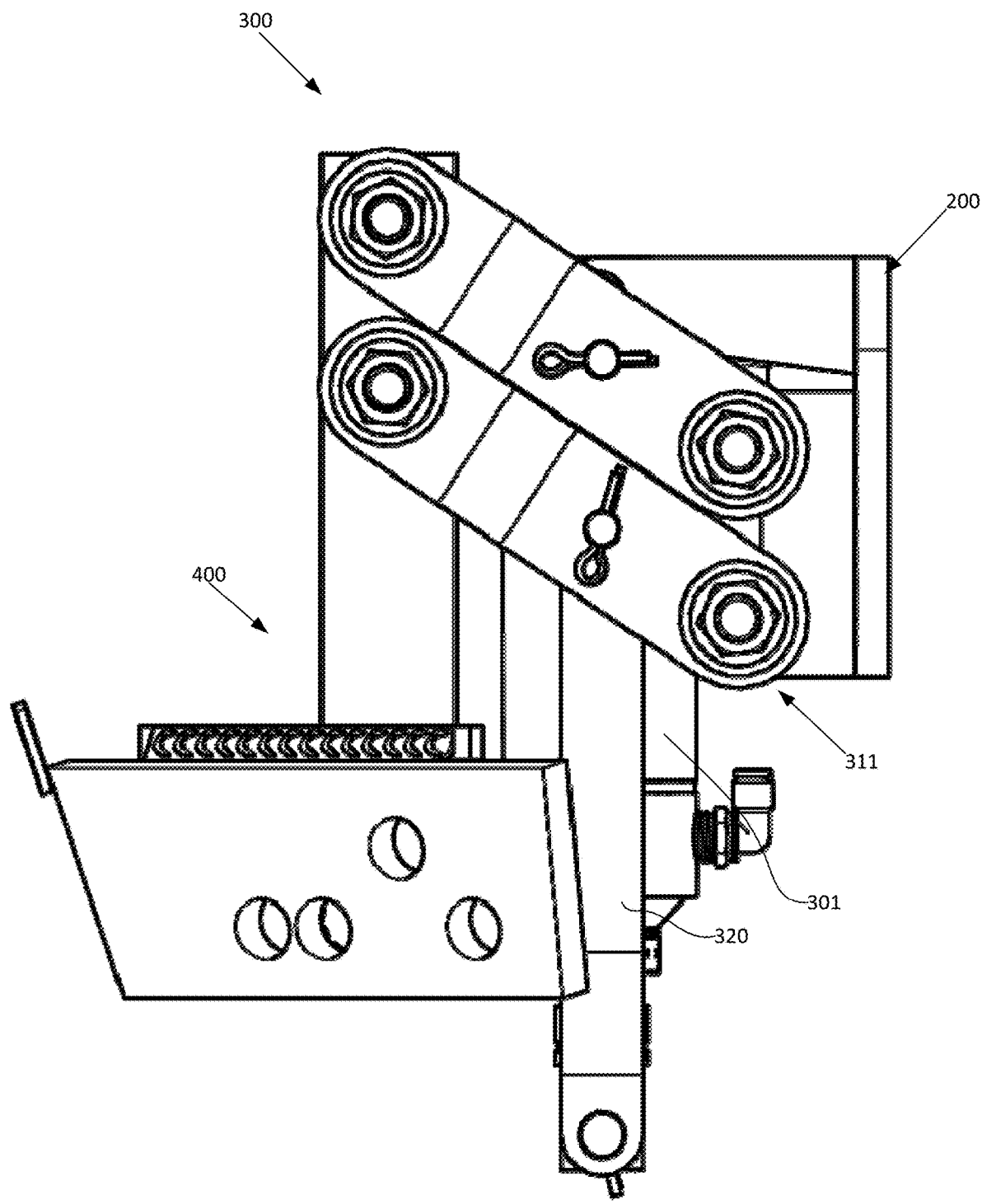
FIG. 14 provides a side view of a compact parallel arm row cleaner with the stem assembly and parallel arm assembly in a raised or compressed state according to an embodiment of the present invention.

With reference now to FIGS. 12, 13, and 14, views of the compact parallel arm floating row cleaner 100 without wheel assemblies 500 affixed to the stem assembly 400 are provided. FIGS. 12-14 further show the range of movement of the stem assembly 400 up and down as it is guided by the left parallel arms 311 and right parallel arms 351 and assisted by the piston 301 over the length of travel of the piston shaft 302. The left piston arm 320 and right piston arm 360 can be more clearly seen here than in FIGS. 8-11 and the left piston arm 320 and right piston arm 360 provide both a mounting point for the bottom of the piston 301 and stabilization to the left parallel arms 311 and right parallel arms 351. The stem assembly 400 comprises a stem body 402 having stem upper pivot mounts 404 and stem lower pivot mounts 406, a stem body bottom 408, a stem base plate 410. The stem base plate 410 comprises a base plate top 412, right side 414, left side 416, bottom 417, front 418, and back 419. A left hub mount plate 420 may be secured (e.g., welded) to the base plate 410 left side 416, and comprises a left hub mount plate front 422, face 424, fastener openings 426, and rear 428. A right hub mount plate 430 may be secured (e.g., welded) to the base plate 410 right side 414, and comprises a right hub mount plate front 432, face 434 (not shown, similar to left hub mount plate face 424), fastener openings 436 (not shown, similar to left hub mount plate fastener openings 426), and rear 438. A stem tab 440 may be used for securing or mounting a spring or other device in some applications. FIG. 12 provides a perspective view of the stem assembly 400 and parallel arm floating assembly 300 in a lowered or uncompressed state. FIG. 13 provides a perspective view of the stem assembly 400 and parallel arm floating assembly 300 in a raised or compressed state. FIG. 14 provides a side view of the stem assembly 400 and parallel arm floating assembly 300 in a raised or compressed state.

Figure 16:
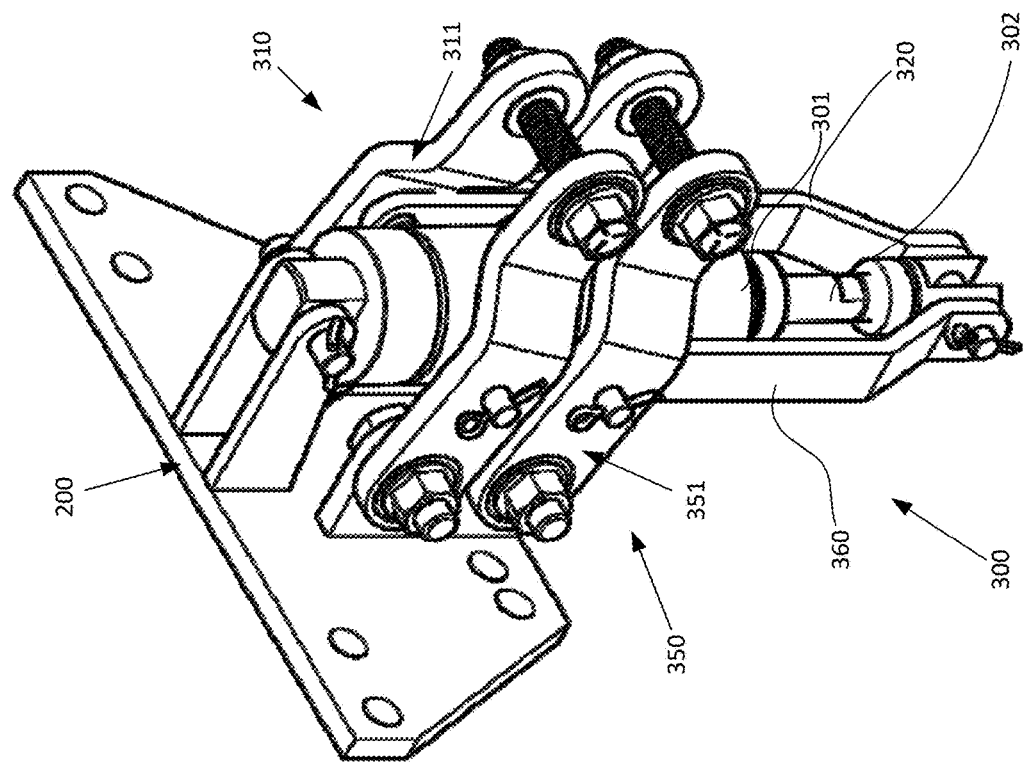
FIG. 16 provides a right side perspective view of a parallel arm assembly for a compact parallel arm row cleaner in a lowered or uncompressed state according to an embodiment of the present invention.
Figure 15:
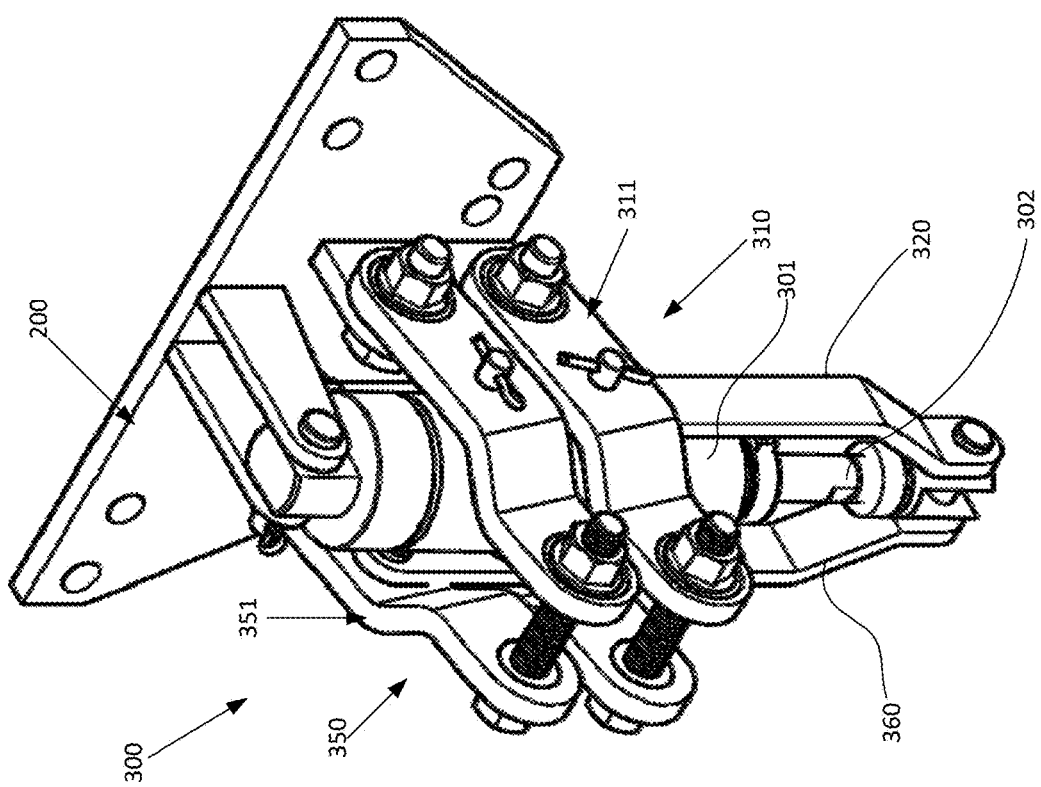
FIG. 15 provides a left side perspective view of a parallel arm assembly for a compact parallel arm row cleaner in a lowered or uncompressed state according to an embodiment of the present invention.
Figure 19:
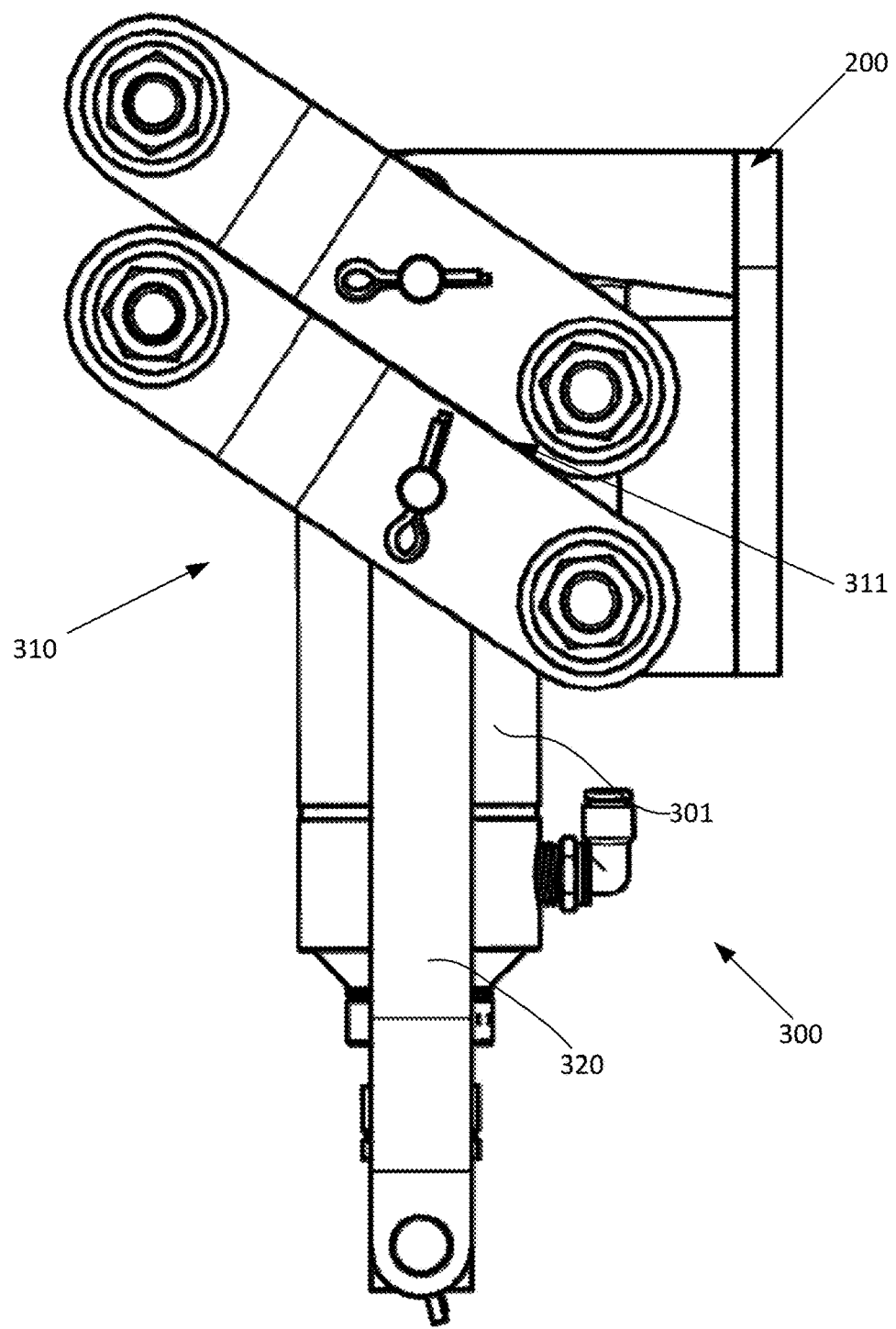
FIG. 19 provides a left side view of a parallel arm assembly for a compact parallel arm row cleaner in a raised or compressed state according to an embodiment of the present invention.
Figure 20:
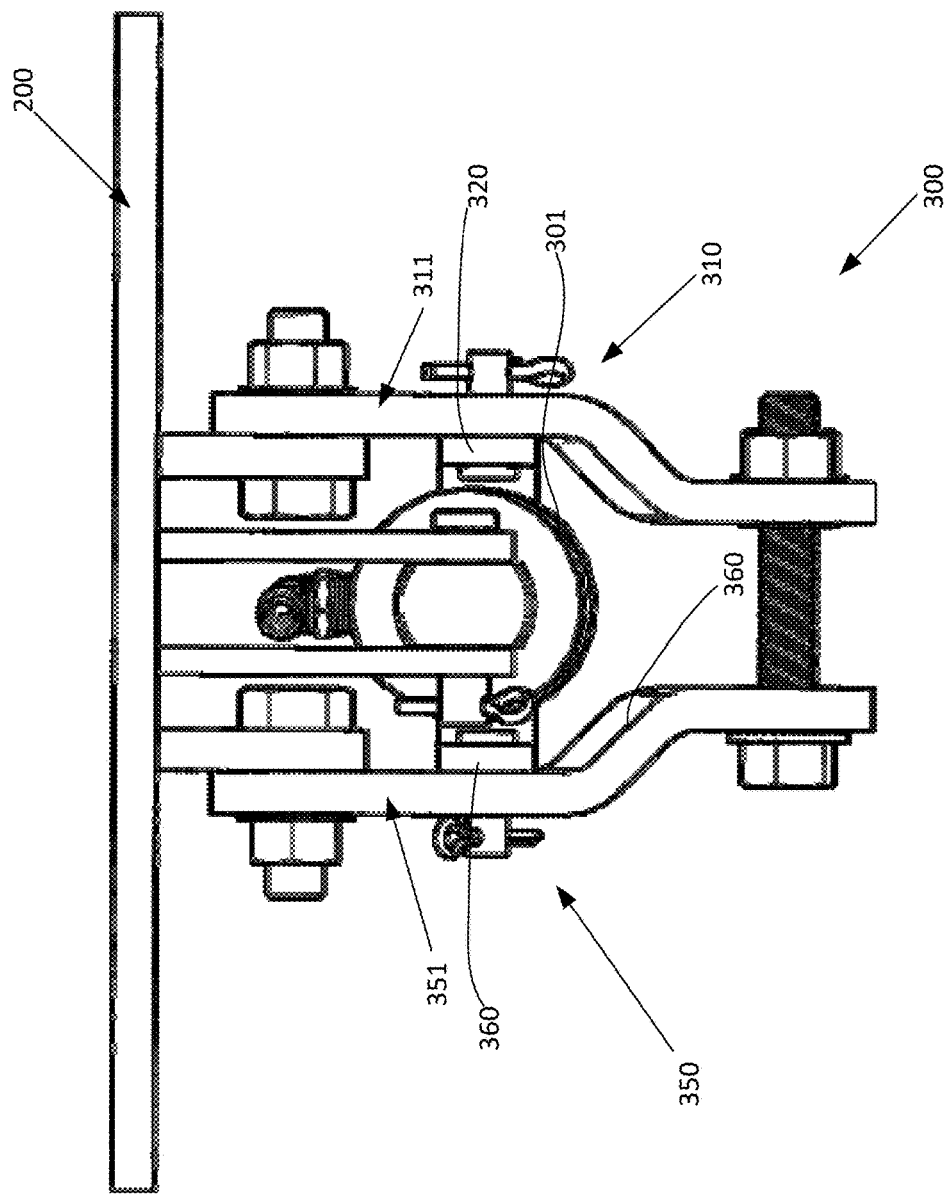
FIG. 20 provides a top view of a parallel arm assembly for a compact parallel arm row cleaner in a lowered or uncompressed state according to an embodiment of the present invention.

With reference now to FIGS. 15, 16, 17, 18, 19, and 20, views of the parallel arm floating assembly 300 and frame mounting plate 200 are provided. FIGS. 15-20 illustrate the elements of the parallel arm floating assembly 300 in both a lowered or uncompressed state and a raised or compressed state. The relative position of the left parallel arms 311, right parallel arms 351, left piston arm 320, right piston arm 360, and piston 301 are shown as the piston shaft 302 extends and retracts over its length of travel. The vertical orientation of the piston 301 provides for the left parallel arms 311 and right parallel arms 351 to be relatively short or compact when compared to "horizontal" floating row cleaner systems. The bends in the left parallel arms 311, right parallel arms 351, left piston arm 320, and right piston arm 360 provide for stability and enable the piston 301 to be vertically positioned between the left arm assembly 310 and right arm assembly 350 while enabling the piston shaft 302 to travel over its full movement range. FIG. 15 provides a left side perspective view of a parallel arm floating assembly 300 for a compact parallel arm row cleaner 100 in a lowered or uncompressed state. FIG. 16 provides a right side perspective view of a parallel arm floating assembly 300 for a compact parallel arm row cleaner 100 in a lowered or uncompressed state. FIG. 17 provides a right side view of a parallel arm floating assembly 300 for a compact parallel arm row cleaner 100 in a lowered or uncompressed state. FIG. 18 provides a front view of a parallel arm floating assembly 300 for a compact parallel arm row cleaner 100 in a lowered or uncompressed state. FIG. 19 provides a left side view of a parallel arm floating assembly 300 for a compact parallel arm row cleaner 100 in a raised or compressed state. FIG. 20 provides a top view of a parallel arm floating assembly 300 for a compact parallel arm row cleaner 100 in a lowered or uncompressed state.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

It should be noted that the present systems and/or methods are not limited to the specific embodiments described herein, but is intended to apply to all similar systems and/or methods for removing debris and/or providing a certain amount of tilling. Modifications and alterations from the described embodiments will occur to those skilled in the art without departure from the spirit and scope of the present systems and/or methods.

What is claimed is:

1. An apparatus for controlling the position of a row cleaner comprising:
   a frame;
   a parallel arm floating assembly comprising:
      a piston having a top and a bottom, the top being movably secured to the frame;
      a first set of arms, each arm in the first set of arms having a proximal end and a distal end, the proximal end movably secured to the frame;
      a second set of arms, each arm in the second set of arms having a proximal end and a distal end, the proximal end movably secured to the frame;
      a piston arm set having a top and a bottom, the top of each arm in the piston arm set movably secured to an arm in one of the first set of arms or the second set of arms, the bottom of each arm in the piston arm set movably secured to the bottom of the piston;
   wherein the piston is disposed between the first set of arms and the second set of arms; and
   wherein the piston and the piston arm set maintain a relative angle when the piston changes from a compressed to an uncompressed state and the first set of arms and the second set of arms change in angular orientation with respect to the frame, the piston, and the piston arms when the piston moves from a compressed to an uncompressed state.

2. The apparatus of claim 1 further comprising a stem assembly.

3. The apparatus of claim 2 further comprising wherein the stem assembly is disposed between the distal end of the first set of arms and the distal end of the second set of arms.

4. The apparatus of claim 2 further comprising wherein the stem assembly provides stability to the first set of arms and the second set of arms.

5. The apparatus of claim 1 further comprising wherein both of the first set of arms and the second set of arms comprise a pair of parallel arms.

6. The apparatus of claim 2 further comprising further comprising a set of wheel assemblies disposed on the stem assembly.

7. The apparatus of claim 6 further comprising wherein the first set of arms, the second set of arms, the set of piston arms, and the piston provide for the movement of the stem assembly and the set of wheel assemblies up and down in a vertical direction.

8. The apparatus of claim 7 further comprising wherein the movement of the stem assembly and the set of wheel assemblies does not change the angle of the of the set of wheel assemblies with respect to a surface.

9. The apparatus of claim 6 further comprising wherein the set of wheel assemblies comprise row cleaner wheels.

10. The apparatus of claim 6 further comprising wherein the set of wheel assemblies comprise one or more selected form the group consisting of treader wheels and scrapers.

11. The apparatus of claim 1 further comprising wherein the piston is a pneumatic piston.

12. The apparatus of claim 1 further comprising wherein the piston is adjustable remotely.

13. The apparatus of claim 1 further comprising wherein the piston further comprises a piston shaft secured to the set of piston arms.

* * * * *